US006049574A

United States Patent [19]

Noonan et al.

[11] Patent Number: 6,049,574
[45] Date of Patent: Apr. 11, 2000

[54] BLIND ADAPTIVE EQUALIZATION USING COST FUNCTION THAT MEASURES DISSIMILARITY BETWEEN THE PROBABILITY DISTRIBUTIONS OF SOURCE AND EQUALIZED SIGNALS

[75] Inventors: Joseph Patrick Noonan, Westford, Mass.; Ilyas Berk Guvelioglu, Dallas, Tex.; Premkumar Natarajan, Arlington, Mass.

[73] Assignee: Trustees of Tufts College, Medford, Mass.

[21] Appl. No.: 09/061,880

[22] Filed: Apr. 17, 1998

[51] Int. Cl.[7] .............................. H03K 5/01; H04B 1/06
[52] U.S. Cl. ........................ 375/346; 375/231; 375/348
[58] Field of Search .................................... 375/229, 231, 375/232, 340, 341, 346, 348; 708/303, 322, 323

[56] References Cited

U.S. PATENT DOCUMENTS

| | | | |
|---|---|---|---|
| 4,270,179 | 5/1981 | Sifford et al. | 708/422 |
| 4,381,561 | 4/1983 | Treiber | 370/294 |
| 4,633,482 | 12/1986 | Sari | 375/232 |
| 4,852,166 | 7/1989 | Masson | 380/36 |
| 4,979,211 | 12/1990 | Benvenuto et al. | 704/251 |
| 5,005,168 | 4/1991 | Cummiskey et al. | 370/276 |
| 5,060,088 | 10/1991 | Dolivo et al. | 360/46 |
| 5,068,873 | 11/1991 | Murakami | 375/231 |
| 5,195,106 | 3/1993 | Kazecki et al. | 375/230 |
| 5,282,225 | 1/1994 | Nikias et al. | 375/232 |
| 5,297,166 | 3/1994 | Batruni | 375/233 |
| 5,319,674 | 6/1994 | Cherubini | 375/232 |
| 5,377,226 | 12/1994 | Davis | 370/342 |
| 5,448,601 | 9/1995 | Choi | 375/232 |
| 5,490,121 | 2/1996 | Gardner et al. | 367/83 |
| 5,500,879 | 3/1996 | Webster et al. | 375/353 |
| 5,537,439 | 7/1996 | Choi | 375/232 |
| 5,602,872 | 2/1997 | Andrews | 375/234 |
| 5,619,533 | 4/1997 | Dent | 375/232 |
| 5,644,595 | 7/1997 | Yamasaki et al. | 375/232 |
| 5,835,731 | 11/1998 | Werner et al. | 375/235 |
| 5,887,035 | 3/1999 | Nolnar | 375/340 |

OTHER PUBLICATIONS

Benveniste, et al., "Blind Equalizers", *IEEE Transactions on Communications*, vol. COM–32, No. 8, pp. 871–883 (1984).

Benveniste, et al., "Robust Identification of a Nonminimum Phase System: Blind Adjustment of a Linear Equalizer in Data Communications", *IEEE Transactions on Automatic Control*, vol. AC–25, No. 3, pp. 385–399.

Forney, "Maximum–Likelihood Sequence Estimation of Digital Sequences in the Presence of Intersymbol Interference", *IEEE Transactions on Information Theory*, vol. IT–18, No. 3, pp. 363–378, (1972).

Gustafsson, et al., "Blind Equalization by Direct Examination of the Input Sequences", *IEEE Transactions on Communications*, vol. 43, No. 7, pp. 2213–2222,(1995).

Hatzinakos, "Blind Equalization on Prediction and Polycepstra Principles", *IEEE Transactions on Communication*, vol. 43, No. 2/3/4, pp. 178–181, (1995).

(List continued on next page.)

*Primary Examiner*—Young T. Tse
*Attorney, Agent, or Firm*—Weingarten, Schurgin, Gagnebin & Hayes LLP

[57] ABSTRACT

A technique for the blind equalization of digital communications channels relies on the iterative minimization of a cost function known as the J-divergence between a known or assumed probability density function (PDF) of the source data signal and an estimated PDF of a receiver decision output signal derived from the equalizer output signal by minimum-distance mapping. The J-divergence function is defined in terms of the Kullback-Leibler distance between the two PDFs. Minimization is achieved by continually updating both an equalizer tap coefficient vector and the estimated PDF of the decision output signal using a stochastic gradient algorithm applied to the J-divergence cost function.

7 Claims, 2 Drawing Sheets

OTHER PUBLICATIONS

Hatzinakos, et al., "Blind Equalization Using a Tricepstrum–Based Algorithm", *IEEE Transactions on Communications,* vol. 39, No. 5, pp. 669–681 (1991).

LeBlanc, "Effects of Source Distributions and Correlation on Fractionally Spaced Blind Constant Modulus Algorithm Equalizers", James Paul LeBlanc, pp. 1–47,(1995).

Lee, et al., "Bayesian Techniques for Blind Deconvolution" *IEEE Transactions on Communications,* vol. 44, No. 7, pp. 826–835,(1996).

Lou, "Channel Estimation Standard and adaptive Blind Equalization", *IEEE Transactions on Communications,* vol. 43, No. 2/3/4, pp. 182–186,(1995).

Mo, "Blind Equalization Using Higher Order Cumulants and Neutral Network", *IEEE Transactions on Signal Processing,* vol. 42, No. 11, pp. 3209–3217, (1994).

Picchi, et al., "Blind Equalization and Carrier Recovery Using a Stop–and–Go Decision–Directed Algorithm", *IEEE Transactions on Communications,* vol. COM–35, No. 9, pp. 877–887,(1987).

Ross et al., "An Enhancement to Blind Equalization Algorithms", *IEEE Transactions on Communications,* vol. 39, No. 5, pp. 636–639,(1991).

Sato, "A Method of Self–Recovering Equalization for Multilevel Amplitude–Modulation", *IEEE Transactions on Communications,* pp. 679–682, (1974).

Shalvi, et al., "Super–Exponential Methods for Blind Deconvolution", *IEEE Transactions on Information Theory,* vol 39, No. 2, pp. 504–519, (1993).

Shalvi, et al., "New Criteria for Blind Deconvolution of Nonminimum Phase Systems (Channels)", *IEEE Transactions on Information Theory,* vol. 36, No. 2, pp. 312–321, (1990).

Tugnait, "Blind Equalization and Estimation of FIR Communications Channels Using Fractonal Sampling", *IEEE Transactions on Communications,* vol. 44, No. 3, pp. 324–336,(1996).

Tugnait, "Blind Equalization and Estimation of Digital Communications FIR Channels Using Cumulant Matching", *IEEE Transactions on Communications,* vol. 43, No. 2/3/4, pp. 1240–1245, (1995).

Ueng, et al. "Adaptive Blind Equalizaton Using Second–and Higher Order Statistics", *IEEE Journal on Selected Areas in Communications,* vol. 13, No. 1, pp. 132–141, (1995).

Wesolowski, "Adaptive Blind Equalizers with Automatically Controlled Parameters", *IEEE Transactions on Communications,* vol. 43, No. 2/3/4, pp. 170–172, (1995).

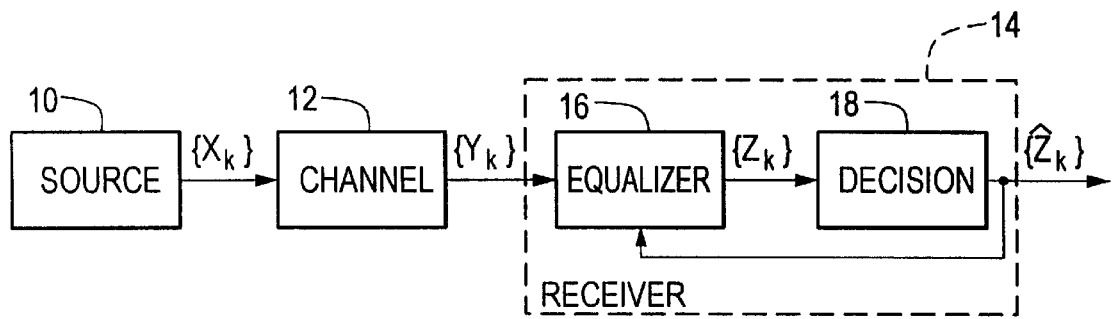
FIG. 1
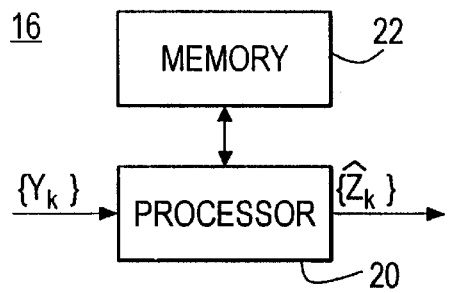
FIG. 2
| K | 23 |
|---|---|
| $Y_k$ | 24 |
| $\theta^k$ | 26 |
| $\theta^{k+1}$ | 28 |
| $P_{\hat{Z}}^k$ | 30 |
| $P_{\hat{Z}}^{k+1}$ | 32 |
22
FIG. 3

BLIND ADAPTIVE EQUALIZATION USING COST FUNCTION THAT MEASURES DISSIMILARITY BETWEEN THE PROBABILITY DISTRIBUTIONS OF SOURCE AND EQUALIZED SIGNALS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to the field of digital communications, and more particularly to techniques for equalizing channel effects in digital communication systems.

Digital communications suffers from a particular form of distortion known as intersymbol interference (ISI). ISI has been recognized as the major obstacle to high speed data transmission over mobile radio channels. Digital communications systems use an operation known as "equalization" to minimize ISI. This minimization is often achieved by minimizing a cost function which is a suitably chosen function of the data.

There are generally two approaches to equalization: conventional equalization and "blind" equalization. In systems employing conventional equalization, a training sequence is transmitted over the channel prior to the transmission of any useful data. The training sequence is a data sequence that is a priori known to the receiver. The receiver uses the relationship between the known training sequence and the sequence it actually receives to construct an approximation of the inverse transfer function for the channel. The equalizer is then configured to use the inverse transfer function and thereby induce minimal ISI.

Conventional equalization is problematic in some communication systems, such as mobile and multi-point communications systems, because the training sequences use up scarce bandwidth resources that could otherwise be used to transmit useful data. Such systems therefore often use blind equalization, which is a form of equalization that does not require the use of a training sequence.

There have been several approaches to the problem of blind equalization including a popular technique known as the Godard algorithm. These algorithms generally employ cost functions that measure the expected value of a function of the equalizer output. For example, the Godard algorithm uses a functional called the dispersion of order p (where p is a positive integer) as the cost function.

It is desirable to improve the ability of digital communications systems to minimize ISI, including communications systems employing blind equalization. Systems achieving such reduced ISI are capable of achieving reduced data error rates at prevailing data transmission rates, or can obtain higher data transmission rates without sacrificing data integrity, in order to obtain better overall system performance.

BRIEF SUMMARY OF THE INVENTION

A blind equalization method is disclosed that achieves improved ISI performance over prior blind equalization techniques. The disclosed method uses a cost function that measures dissimilarity between an assumed or known probability density function (PDF) of a source data signal and a continually-estimated PDF of an equalized data signal recovered by a decision function coupled to the equalizer output. The measure of dissimilarity used is akin to a "distance" as that term is used in topology or communications theory. One such cost function, termed the J-divergence of the two PDFs, measures the cross entropy between two PDFs. A set of tap coefficients used to realize the equalizer, along with the estimated PDF of the equalized data signal, are continually updated in a manner tending to minimize the J-divergence, so that the statistics of the equalized signal are made to closely match those of the source signal. A stochastic gradient algorithm for performing this minimizing updating is disclosed. The disclosed equalization technique generally converges to a lower level of ISI than do prior techniques such as the Godard algorithm.

BRIEF DESCRIPTION OF THE SEVERAL VIEWS OF THE DRAWING

An embodiment of the invention is described below with respect to the accompanying drawing, in which:

FIG. 1 is a block diagram of an exemplary digital communications system in accordance with the principles of the present invention;

FIG. 2 is a block diagram of a receiver in the communications system of FIG. 1;

FIG. 3 is a map of data elements stored in memory in the receiver of FIG. 2 during operation thereof.

DETAILED DESCRIPTION OF THE INVENTION

Figure 4:
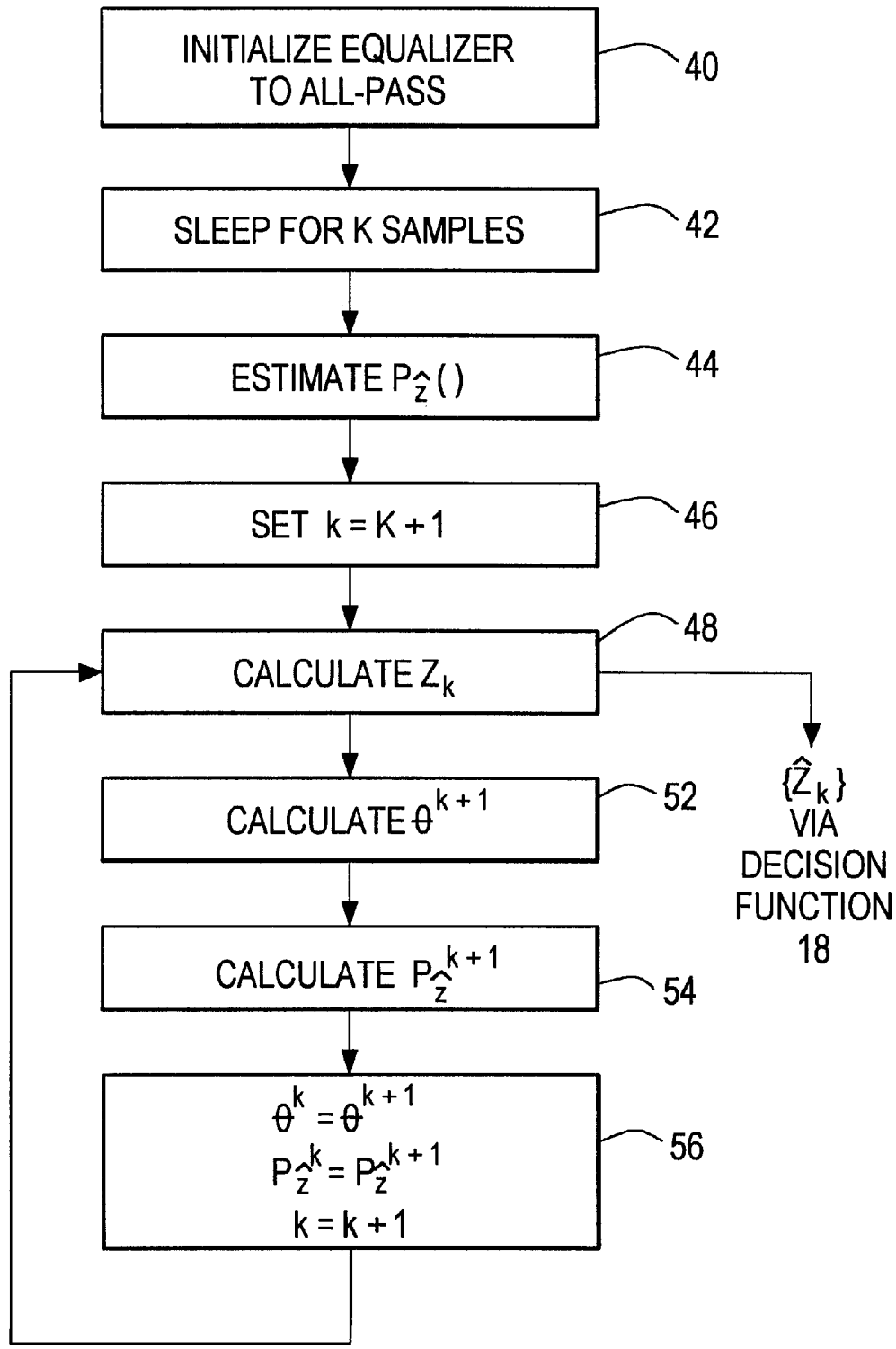
FIG. 4 is a flow diagram of the operation of the receiver of FIG. 2.

In FIG. 1 a source 10 such as a modem emits a source signal $\{x_k\}$ that is transmitted over a channel 12. The signal $\{y_k\}$ received from the channel is provided to a receiver 14, which as shown includes an equalizer 16 and a decision function 18. The output of the equalizer is referred to as $\{z_k\}$, and the output of the decision function is referred to as $\{\hat{z}_k\}$.

In general, the signal $\{x_k\}$ is an amplitude-modulated digital communications signal, either pulse- or quadrature-amplitude modulated. If the signal $\{x_k\}$ is pulse-amplitude modulated, it is a real-valued M-ary signal and is known as an M-PAM signal. An M-PAM signal $\{x_k\}$ takes on signalling values that are symbols in an M-ary symbol alphabet A given by:

$$A = \{-(M-1)d, \ldots -3d, -d, d, 3d, \ldots (M-1)d\},$$

where M is the number of discrete levels in the alphabet and 2d is the amplitude difference between adjacent levels.

If $\{x_k\}$ is quadrature-amplitude modulated, it contains real and imaginary M-ary component signals and is known as an M-QAM signal. The M-QAM case is not described in detail herein; however, the disclosed techniques upon suitable modification are likewise applicable to M-QAM systems.

The symbols appearing in the signal $\{x_k\}$ are a priori known or assumed to be distributed according to a probability density function (PDF) $p_x(\ )$. In one case for which results are given herein, the samples $x_k$ of the signal $\{x_k\}$ are assumed to be statistically independent of each other and to be equally likely to be any of the M possible symbols in A.

In this special case the samples $x_k$ are said to be "independent and identically distributed" or i.i.d. random variables. However, the techniques described herein are generally applicable to source signals having different PDFs.

The channel 12 is assumed to be a linear finite impulse (FIR) response filter. The equalizer 16 is realized as a FIR filter with adjustable coefficients. The decision function 18 resolves each sample $z_k$ of the equalizer output signal $\{z_k\}$ to the closest corresponding symbol from the alphabet A using a minimum-distance function. The decision output signal $\{\hat{z}_k\}$ is available to a data recipient not shown in FIG. 1, and is also fed back to the equalizer 16 for use in the adaptive equalization algorithm as described below.

FIG. 2 shows a block diagram of the equalizer 16 of FIG. 1. A processor 20 is adapted to receive the signal $\{y_k\}$ and to output the equalized data signal $\{\hat{z}_k\}$. The processor 20 may be a general purpose digital signal processor, or other suitable processing means such as are known in the art. The equalizer 16 also uses memory 22 to store various parameters, signals, and intermediate results during execution of the equalization algorithm.

FIG. 3 illustrates some of the key data components appearing in memory 22. A first component K (23) is used during initialization as described below. $Y_k$ (24) is a regressor of inputs to the equalizer 16, and is expressed as:

$$Y_k[y_{k+N} \ldots y_k \ldots y_{k-N}]^T$$

where $[\ ]^T$ denotes vector transposition.

The component $\theta^k$ (26) is a vector of tap coefficients used in the equalizer 16, and $\theta^{k+1}$ (28) is a tap coefficient vector being calculated during each sampling interval for use in the next sampling interval. These vectors are expressed as:

$$\theta = [\theta_{-N} \ldots \theta_0 \ldots \theta_N]$$

Components 30 and 32 represent current and next values, respectively, of an estimated PDF of the signal $\{\hat{z}_k\}$, these PDFs being denoted $p_{\hat{z}}^k(\ )$ and $p_{\hat{z}}^{k+1}(\ )$. The characteristics of these PDFs are described in greater detail below.

The Cost Function

The equalizer 16 employs a cost function based on a value known as the Kullback-Leibler (KL) distance between two PDFs $p_1$ and $p_2$. This value is denoted $KL(p_1, p_2)$ and is given by the expression:

$$KL(p_1, p_2) = E_1\left\{\ln \frac{(p_1)}{(p_2)}\right\}$$

where $E_1\{\ \}$ indicates expectation with respect to $p_1(\ )$.

The KL distance is used to construct a function called the J-divergence having topological properties, in particular the property of symmetry, that make it suitable for use in the manner described herein. The J-divergence is defined as:

$$Jdiv(p_1, p_2) = KL(p_1, p_2) + KL(p_2, p_1)$$

The cost function used in the illustrated embodiment is denoted $J(\theta)$, and is generally given by:

$$J(\theta) = Jdiv(p_{\hat{z}}, p_x)$$

In the case where $\{x_k\}$ is an M-PAM, i.i.d. signal, $J(\theta)$ is given by:

$$J(\theta) = \sum_{i=1}^{M} \ln\left(\frac{p_2(l_i)}{p_x(l_i)}\right)[p_2(l_i) - p_x(l_i)]$$

The Stochastic Gradient Algorithm

The equalizer 16 employs a stochastic gradient algorithm in order to minimize the J-divergence between the PDFs $p_x(\ )$ and $p_{\hat{z}}(\ )$. The general form of this algorithm used in the equalizer 16 is as follows:

$$VAR^{k+1} = VAR^k - \gamma \nabla_{VAR} J(\theta)$$

where $\nabla$ is the gradient operator and $\gamma$ is the iteration step size. The equalizer 16 employs the stochastic gradient algorithm in two ways: (1) to update the tap coefficient vector $\theta$, and (2) to update the PDF $p_{\hat{z}}(\ )$. In each use of the algorithm the variable being updated is substituted for VAR in the above equation. It can be shown that, for the case of $\{x_k\}$ being M-PAM and i.i.d., the algorithm for each use reduces to the following:

$$\theta^{k+1} = \theta^k - \gamma Y_k \left[1 + \ln\left(\frac{p_{\hat{z}}(\hat{z}_k)}{p_x(\hat{z}_k)}\right) - \frac{p_x(\hat{z}_k)}{p_{\hat{z}}(\hat{z}_k)}\right] \frac{\partial p_{\hat{z}}(\hat{z}_k)}{\partial \hat{z}_k}$$

$$p_{\hat{z}}^{k+1}(\hat{z}_k) = p_{\hat{z}}^k(\hat{z}_k) - \alpha \left[1 + \ln\left(\frac{p_{\hat{z}}(\hat{z}_k)}{p_x(\hat{z}_k)}\right) - \frac{p_x(\hat{z}_k)}{p_{\hat{z}}(\hat{z}_k)}\right]$$

where $\gamma$ and $\alpha$ are the step sizes of the respective updates.

FIG. 4 shows the flow of blind adaptive equalization processing carried out by the processor 20 of FIG. 2. In step 40 the equalizer 16 is initialized as an all-pass filter. The order of the equalizer is given as (2N+1), and thus the initial equalizer tap coefficient vector $\theta$ is:

$$[0 \ldots 0\ 1\ 0 \ldots 0]$$

where the single "1" is the $(N+1)^{th}$ element of the vector. This equalizer configuration sets the signal $\{z_k\}$ equal to the signal $\{y_k\}$ during an initial period.

In step 42, the process waits for an initial period of K samples. During this initial period, an initial regressor $Y_k$ is collected in the equalizer 16, and the first K samples of $\{\hat{z}_k\}$ are collected.

In step 44, the first K samples of $\{\hat{z}_k\}$ are used to create an initial estimate of the PDF $p_{\hat{z}}(\ )$. This PDF is estimated by generating a histogram from the initial samples or by fitting a gaussian kernel to the samples, and then normalizing the resulting PDF over the finite support. The normalized PDF is used as the initial estimate of the PDF $p_{\hat{z}}(\ )$.

At step 46 of FIG. 4, an index variable k is set equal to K+1, and then the process enters a loop of steps 48–56 which are repeated for each new sample $y_k$ of the received data signal.

In step 48 an equalizer output value $z_k$ is calculated from the regressor $Y_k$ and the vector $\theta^k$. This calculation is a FIR filter as follows:

$$z_k = Y_k^T \theta$$

As shown, the data output symbols $\{\hat{z}_k\}$ emerging from the receiver 14 are created by the continued iterations of step 48 in conjunction with the decision function 18 of FIG. 3.

In step 52, the next tap coefficient vector $\theta^{k+1}$ (28) is calculated using the J-divergence function and the stochastic gradient algorithm as described above.

In step 54, the next estimated PDF $p_{\hat{z}}^{k+1}(\hat{z}_k)$ (32) is calculated also using the J-divergence function and the stochastic gradient algorithm as described above.

In step 56, the PDF $p_{\hat{z}}(\ )$ and the vector $\theta$ are updated by substituting the new values $p_{\hat{z}}^{k+1}$ (32) and $\theta^{k+1}$ (28) respectively for $p_{\hat{z}}^{k}$ (30) and $\theta^{k}$ (26). Then the index variable k is incremented, and the top of the loop (step 48) is re-entered.

While the invention has been described with reference to an embodiment in which the source signal $\{x_k\}$ is M-PAM, it can be readily shown that the blind equalization method can also be used with a quadrature-amplitude-modulated (M-QAM) source signal. Also other cost functions can be employed, one such alternative being the mean square function. In addition, it will be appreciated by those skilled in the art that other modifications to and variations of the disclosed blind equalization method are possible without departing from the innovative concepts contained herein. Accordingly the invention herein disclosed is not to be viewed as limited except as by the scope and spirit of the appended claims below.

What is claimed is:

1. An equalization method, comprising the steps of:
   (i) generating an equalizer output signal $\{z_k\}$ from a channel output signal $\{y_k\}$ and a series of updates of an equalizer tap coefficient vector $\theta$, the signal $\{y_k\}$ being obtained from a communications channel having as input a source signal $\{x_k\}$ having symbols drawn from an alphabet A either assumed or known to be distributed according to a predetermined probability density function (PDF) $p_x(\ )$;
   (ii) generating a decision output signal $\{\hat{z}_k\}$ from the signal $\{z_k\}$ based on the proximity of each sampled value $z_k$ to a corresponding symbol in A;
   (iii) continually updating an estimated PDF $p_{\hat{z}}(\ )$ according to which the values of the signal $\{z_k\}$ are estimated to be distributed among the symbols of A, the PDF $p_{\hat{z}}(\ )$ being updated in a manner tending to minimize a cost function that measures dissimilarity between the PDF $p_x(\ )$ and the PDF $p_{\hat{z}}(\ )$; and
   (iv) continually updating the vector $\theta$ in a manner also tending to minimize the cost function.

2. A method according to claim 1, wherein the cost function is the J-divergence of the PDFs $p_x(\ )$ and $p_{\hat{z}}(\ )$.

3. A method according to claim 1, wherein each of the updating steps comprises the step of performing a stochastic gradient algorithm on the cost function with respect to the variable being updated.

4. A method according to claim 1, further comprising the steps of:
   setting the vector $\theta$ to an initial all-pass value such that the signal $\{z_k\}$ is equal to the signal $\{y_k\}$ throughout an initialization period;
   retaining the samples of the signal $\{\hat{z}_k\}$ generated from the signal $\{z_k\}$ during the initialization period; and
   calculating an initial value of the PDF $p_{\hat{z}}(\ )$ at the end of the initialization period based on the retained samples of the signal $\{\hat{z}_k\}$.

5. A method according to claim 4, wherein the step of calculating the initial value of the PDF $p_{\hat{z}}(\ )$ comprises the steps of:
   constructing a PDF from the retained samples of the signal $\{\hat{z}_k\}$; and
   normalizing the constructed PDF.

6. A method according to claim 1, wherein the source signal $\{x_k\}$ is an M-ary pulse-amplitude-modulated signal (M-PAM).

7. A method of equalizing a channel over which a source signal $\{x_k\}$ is transmitted, comprising the steps of:
   initializing an equalizer tap coefficient vector $\Theta^k$ to an all-pass value so that an equalizer output signal $\{z_k\}$ is initially equal to a channel output signal $\{y_k\}$ provided as input to the equalizer;
   mapping the signal $\{z_k\}$ to a decision output signal $\{\hat{z}_k\}$ the samples of which are drawn from a symbol alphabet A from which the samples of the signal $\{x_k\}$ are also drawn;
   during an initial period of K samples, collecting an initial regressor $Y_k$ of the first K samples of $\{y_k\}$ and also collecting the first K samples of the signal $\{\hat{z}_k\}$;
   calculating an initial value of an estimated PDF $p_{\hat{z}}^k(\ )$ from the collected samples of $\{\hat{z}_k\}$, the estimated PDF $p_{\hat{z}}^k(\ )$ describing the distribution of samples of the signal $\{\hat{z}_k\}$ over the alphabet A; and
   repeating the following steps for each new sample $y_k$ of the channel output signal $\{y_k\}$:
   (i) updating the regressor $Y_k$ to include the new sample $y_k$;
   (ii) calculating an equalizer output value $z_k$ from the regressor $Y_k$ and the vector $\Theta^k$;
   (iii) calculating a next tap coefficient vector $\Theta^{k+1}$ using a stochastic gradient algorithm to minimize a J-divergence function of the PDF $p_{\hat{z}}^k(\ )$ and a PDF $p_x(\ )$ describing the distribution of samples of the signal $\{x_k\}$ over the alphabet A;
   (iv) calculating a next estimated PDF $p_{\hat{z}}^{k+1}(\ )$ using the stochastic gradient algorithm to minimize the J-divergence function of the PDFs $p_x(\ )$ and $p_{\hat{z}}^k(\ )$; and
   (v) updating the PDF $p_{\hat{z}}^k(\ )$ and the vector $\Theta^k$ to the new values $p_{\hat{z}}^{k+1}$ and $\Theta^{k+1}$, respectively.

* * * * *

UNITED STATES PATENT AND TRADEMARK OFFICE
CERTIFICATE OF CORRECTION

PATENT NO. : 6,049,574
DATED : April 11, 2000
INVENTOR(S) : Joseph Patrick Noonan et al.

It is certified that error appears in the above-identified patent and that said Letters Patent is hereby corrected as shown below:

Column 3,
Line 64, the equation "$J(\theta) = Jdiv(p_2.p_x)$" should read -- $J(\theta) = Jdiv(p_2,p_x)$ --

Column 4,
Line 1, the equation $J(\theta) = \sum_{i=1}^{M} \ln\left(\frac{p_2(l_i)}{p_x(l_i)}\right)[p_1(l_i) - p_x(l_i)]$ should read $J(\theta) = \sum_{i=1}^{M} \ln\left(\frac{p_2(l_i)}{p_x(l_i)}\right)[p_2(l_i) - p_x(l_i)]$ Signed and Sealed this Tenth Day of May, 2005

JON W. DUDAS
*Director of the United States Patent and Trademark Office*